(12) United States Patent
Daigle et al.

(10) Patent No.: US 11,239,496 B2
(45) Date of Patent: Feb. 1, 2022

(54) ADDITIVE FOR ELECTROLYTES

(71) Applicants: HYDRO-QUÉBEC, Montréal (CA); MURATA MANUFACTURING CO., LTD., Nagaokakyo (JP)

(72) Inventors: Jean-Christophe Daigle, Longueuil (CA); Shinichi Uesaka, Westmount (CA); Yuichiro Asakawa, Montréal (CA); Karim Zaghib, Longueuil (CA)

(73) Assignees: HYDRO-QUEBEC, Montreal (CA); MURATA MANUFACTURING CO., LTD., Nagaokakyo (JP)

( * ) Notice: Subject to any disclaimer, the term of this patent is extended or adjusted under 35 U.S.C. 154(b) by 206 days.

(21) Appl. No.: 16/091,811

(22) PCT Filed: Apr. 5, 2017

(86) PCT No.: PCT/CA2017/050414
§ 371 (c)(1),
(2) Date: Oct. 5, 2018

(87) PCT Pub. No.: WO2017/173538
PCT Pub. Date: Oct. 12, 2017

(65) Prior Publication Data
US 2019/0103632 A1 Apr. 4, 2019

Related U.S. Application Data

(60) Provisional application No. 62/318,988, filed on Apr. 6, 2016.

(51) Int. Cl.
*H01M 10/0567* (2010.01)
*H01M 4/485* (2010.01)
(Continued)

(52) U.S. Cl.
CPC ....... *H01M 10/0567* (2013.01); *H01M 4/485* (2013.01); *H01M 4/5825* (2013.01);
(Continued)

(58) Field of Classification Search
CPC .................................................. H01M 10/0567
See application file for complete search history.

(56) References Cited

U.S. PATENT DOCUMENTS

| 5,759,714 A | 6/1998 | Matsufuji et al. |
| 8,735,002 B2 | 5/2014 | Scordilis-Kelly et al. |

(Continued)

FOREIGN PATENT DOCUMENTS

| CN | 101331642 A | 12/2008 |
| JP | S61214377 A | 9/1986 |

(Continued)

OTHER PUBLICATIONS

Machine translation of JP 2016-006759 (no date).*
(Continued)

*Primary Examiner* — Amanda C. Walke
(74) *Attorney, Agent, or Firm* — Buchanan Ingersoll & Rooney P.C.

(57) ABSTRACT

There is provided a use, in an electrolyte for a battery, of an additive which comprises at least one organocatalyst. Also, there is provided a method of preventing the contact between the anode and residual water in a battery and/or reducing the level of gas in a battery. Moreover, there is provided electrolyte for a battery, comprising an additive which comprises at least one organocatalyst. Moreover, there is provided a battery comprising an electrolyte which comprises an additive which comprises at least one organocatalyst.

7 Claims, 13 Drawing Sheets

(51) Int. Cl.
  *H01M 10/42* (2006.01)
  *H01M 10/052* (2010.01)
  *H01M 4/58* (2010.01)
  *H01M 10/52* (2006.01)
  *H01M 4/02* (2006.01)

(52) U.S. Cl.
  CPC ..... *H01M 10/052* (2013.01); *H01M 10/4235* (2013.01); *H01M 10/523* (2013.01); *H01M 2004/027* (2013.01)

(56) References Cited

U.S. PATENT DOCUMENTS

| | | | |
|---|---|---|---|
| 9,093,720 | B2* | 7/2015 | Park ................. H01M 10/0567 |
| 2005/0231894 | A1 | 10/2005 | Yoshida et al. |
| 2008/0305403 | A1 | 12/2008 | Park et al. |
| 2012/0251892 | A1 | 10/2012 | Kang et al. |
| 2013/0337315 | A1 | 12/2013 | Yamamoto et al. |
| 2014/0193707 | A1 | 7/2014 | Schmidt et al. |
| 2014/0294476 | A1 | 10/2014 | Hashimoto et al. |
| 2014/0335357 | A1 | 11/2014 | Takeuchi et al. |
| 2017/0098858 | A1* | 4/2017 | Kim .................... H01M 10/052 |

FOREIGN PATENT DOCUMENTS

| | | |
|---|---|---|
| JP | H09199169 A | 7/1997 |
| JP | 2002305022 A | 10/2002 |
| JP | 2009519581 A | 5/2009 |
| JP | 2012151377 A | 8/2012 |
| JP | 2012174350 A | 9/2012 |
| JP | 2012174413 A | 9/2012 |
| JP | 2014199368 A | 10/2014 |
| JP | 2014235929 A | 12/2014 |
| JP | 2016006759 A | 1/2016 |
| JP | 2016157525 A | 9/2016 |
| WO | 2007069852 A1 | 6/2007 |
| WO | 2012039477 A1 | 3/2012 |
| WO | 2013080515 A1 | 6/2013 |

OTHER PUBLICATIONS

Machine translation of JP 2014-235929 (no date).*
Machine translation of JP 2012-174413 (no date).*
Machine translation of JP 2012-151377 (no date).*
Extended European Search Report dated Oct. 21, 2019, issued by the European Patent Office in corresponding European Application No. 17778511.0-1103, (8 pages).
Belharouak, I. et al."Gassing and performance degradation in Li4Ti5O12 based Li-ion batteries" The 29th International Battery Seminar and Exhibit 2012: Primary and Secondary Batteries—Other Technologies, 2012; pp. 874-887.
Wu, K. et al."Investigation on gas generation of Li4Ti5O12/LiNi1/3Co1/3Mn1/3O2 cells at elevated temperature" Journal of Power Sources, 2013, vol. 237, pp. 285-290.
Wu, K. et al."Investigation on Li4Ti5O12 batteries developed for hybrid electric vehicle" J. Appl. Electrochem., 2012, vol. 42, pp. 989-995.
Han, L. et al."The analysis and research on the coating and drying method of electrode of the Li-ion power battery" In Advanced Materials Research, 2013; vol. 765-767, pp. 3184-3187.
Kim, S. K. et al."A study on improving drying performance of spinel type LiMn2O4 as a cathode material for lithium ion battery" International Journal of Electrochemical Science, 2011, vol. 6, pp. 5462-5469.
Bouayad, H. et al."Improvement of Electrode/Electrolyte Interfaces in High-Voltage Spinel Lithium-Ion Batteries by Using Glutaric Anhydride as Electrolyte Additive" The Journal of Physical Chemistry C, 2014, vol. 118, pp. 4634-4648.
Lu, Q. et al."A polyimide ion-conductive protection layer to suppress side reactions on Li4Ti5O12 electrodes at elevated temperature" RSC Advances, 2014, vol. 4, pp. 10280-10283.
Nederberg, F. et al."Organocatalytic Ring Opening Polymerization of Trimethylene Carbonate. Biomacromolecules" 2007, vol. 8, pp. 153-160.
Brown, H. A. et al.Amidine-Mediated Zwitterionic Polymerization of Lactide. ACS Macro Letters, 2012, vol. 1, pp. 1113-1115.
Choi, N.-S. et al."Recent advances in the electrolytes for interfacial stability of high-voltage cathodes in lithium-ion batteries" RSC Advances, 2015, vol. 5, pp. 2732-2748.
Zhang, S. et al."Understanding Solid Electrolyte Interface Film Formation on Graphite Electrodes" Electrochemical and Solid-State Letters, 2001, vol. 4, pp. A206-A208.
Xu, K.Electrolytes and Interphasial Chemistry in Li Ion Devices, Energies, vol. 3. pp. 135-154.
Chang, Y. A. et al."Ion pairing effects in the zwitterionic ring opening polymerization of [small delta]-valerolactone" Polymer Chemistry, 2015, vol. 6, pp. 5212-5218.
International Search Report (Form PCT/ISA/210) dated Jul. 4, 2017, by the International Search Authority in corresponding International Application No. PCT/CA2017/050414, (6 pages).
Written Opinion {PCT/ISA/237} dated Jul. 4, 2017, by the Sweden Patent Office as The International Searching Authority tor International Application No. PCT/SE2016/050382.
Office Action (Notice of Reasons for Refusal) dated Feb. 9, 2021 by the Japanese Patent Office in corresponding Japanese Patent Application No. 2018-550365, and an English Translation of the Office Action. (11 pages).
Search Report dated Jan. 29, 2021, by the Japanese Patent Office in corresponding Japanese Patent Application No. 2018-550365, and an English Translation of the Search report. (65 pages).
Office Action (The First Office Action) dated Jul. 13, 2021, by the State Intellectual Property Office (SIPO) of the People's Republic of China in corresponding Chinese Patent Application No. 201780029826.2, and an English Translation of the Office Action. (38 pages).
Office Action (Examination Report) dated Jan. 27, 2021, by the Intellectual Property India—Government of India in corresponding Indian Patent Application No. 201817041468, with an English Translation. (6 pages).

* cited by examiner

ADDITIVE FOR ELECTROLYTES

FIELD OF THE INVENTION

The invention relates generally to additives for electrolytes. More specifically, the invention relates to the use of an organocatalyst as additive in an electrolyte that comprises carbonates. The electrolyte according to the invention may be used in batteries wherein the anode comprises reactive groups. The organocatalyst facilitates the reaction between the reactive groups and the carbonates, which leads to the formation of a protective layer on the surface of the anode, thus preventing contact between the anode and residual water in the battery and also preventing degradation of the carbonates in the electrolyte. Batteries using the electrolyte according to the invention are more stable and secure.

BACKGROUND OF THE INVENTION

Water is a residual contaminant in battery electrodes. For example, during the cycling of a battery wherein the anode is of lithium titanium oxide (LTO), water, in contact with LTO, generates hydrogen and oxygen. Typically in such batteries, cathodes are based on $LiMPO_4$ where M is Fe, Co, Ni, Mn, etc.; and the electrolyte is a mixture of linear carbonates and cyclic carbonates as solvents and a salt which can be $LiPF_6$, LiFSI, LiTFSI, LiBOB, $LiBF_4$ or any other suitable commercial salts comprising lithium. This also occurs in batteries wherein the anode comprises a material such as hydrogen titanium oxide (HTO), $TiO_2$, Si, $SiO_x$, Sn and graphite. Moreover, this occurs in batteries wherein the cathode is a high energy cathode.

During the cycling of such batteries, for example a battery wherein the anode is of LTO, electrolytes (carbonates) can react with the residual water in presence of the anode to form $CO_2$, CO, $H_2$, $O_2$ and hydrocarbons. These products are known to cause an inflation of the pouch cell and could constitute a security issue [1-3].

One strategy to address this issue in the industry consists of removing water from the cathode and the anode. Since the active materials are generally hydrophilic, the electrodes need to be dried carefully. This generally requires a high amount of energy and thus an increase in costs [4].

Another strategy is to allow the formation of a protective coating at the interface on the electrodes. The coating can prevent the contact between the electrolyte and the active surface of the electrodes. For example, an additive is used in the electrolyte, and the decomposition of the additive forms a film [6]. Also, the formation of a shell directly on the active materials before assembling the cell has been performed to create a protection layer on the anode of LTO [7].

There is still a need for methods of preventing the anode from contacting residual water in a battery.

SUMMARY OF THE INVENTION

The inventors have discovered the use of an organocatalyst as additive in an electrolyte that comprises carbonates. The electrolyte according to the invention may be used in batteries wherein the anode comprises reactive groups. The organocatalyst facilitates the reaction between the reactive groups and the carbonates, which leads to the formation of a protective layer on the surface of the anode, thus preventing contact between the anode and residual water in the battery and also preventing degradation of the carbonates in the electrolyte. Batteries using the electrolyte according to the invention are more stable and secure.

The invention thus provides for the following according to aspects thereof:

(1) Use, in an electrolyte for a battery, of an additive which comprises at least one organocatalyst.

(2) Use, in an electrolyte which comprises at least one carbonate, of an additive which comprises at least one organocatalyst.

(3) Use, in a battery wherein the anode comprises reactive groups and the electrolyte comprises at least one carbonate, of an additive which comprises at least one organocatalyst.

(4) Use, in a battery wherein the anode comprises a material selected from the group consisting of lithium titanium oxide (LTO), hydrogen titanium oxide (HTO), $TiO_2$, Si, $SiO_x$, Sn, graphite and a combination thereof and the electrolyte comprises at least one carbonate, of an additive which comprises at least one organocatalyst.

(5) Use, in a battery wherein the anode comprises a material which is lithium titanium oxide (LTO) and the electrolyte comprises at least one carbonate, of an additive which comprises at least one organocatalyst.

(6) A method of preventing contact between the anode and residual water in a battery and/or reducing the level of gas in a battery, the method comprising using an electrolyte which comprises at least one organocatalyst.

(7) A method of preventing contact between the anode and residual water in a battery and/or reducing the level of gas in a battery wherein the electrolyte comprises at least one carbonate, the method comprising adding in the electrolyte at least one organocatalyst.

(8) A method of preventing contact between the anode and residual water in a battery and/or reducing the level of gas in a battery wherein the anode comprises reactive groups and the electrolyte comprises at least one carbonate, the method comprising adding in the electrolyte at least one organocatalyst.

(9) A method of preventing contact between the anode and residual water in a battery and/or reducing the level of gas in a battery and/or preventing degradation of carbonates in the electrolyte, wherein the anode comprises a material selected from the group consisting of lithium titanium oxide (LTO), hydrogen titanium oxide (HTO), $TiO_2$, Si, $SiO_x$, Sn; graphite and a combination thereof and the electrolyte comprises at least one carbonate, the method comprising adding in the electrolyte at least one organocatalyst.

(10) A method of preventing contact between the anode and residual water in a battery and/or reducing the level of gas in a battery and/or preventing degradation of carbonates in the electrolyte, wherein the anode comprises a material which is lithium titanium oxide (LTO) and the electrolyte comprises at least one carbonate, the method comprising adding in the electrolyte at least one organocatalyst.

(11) An electrolyte for a battery, comprising an additive which comprises at least one organocatalyst.

(12) An electrolyte for a battery wherein the anode comprises a material selected from the group consisting of lithium titanium oxide (LTO), hydrogen titanium oxide (HTO), $TiO_2$, Si, $SiO_x$, Sn, graphite and a combination thereof, the electrolyte comprising an additive which comprises at least one organocatalyst.

(13) An electrolyte for a battery wherein the anode comprises a material which is lithium titanium oxide (LTO), the electrolyte comprising an additive which comprises at least one organocatalyst.

(14) A battery wherein the electrolyte comprises an additive which comprises at least one organocatalyst.

(15) A battery wherein the electrolyte comprises at least one carbonate, the electrolyte further comprising an additive which comprises at least one organocatalyst.

(16) A battery wherein the anode comprises reactive groups and the electrolyte comprises at least one carbonate, the electrolyte further comprising an additive which comprises at least one organocatalyst.

(17) A battery wherein the anode comprises a material selected from the group consisting of lithium titanium oxide (LTO), hydrogen titanium oxide (HTO), $TiO_2$, Si, $SiO_x$, Sn, graphite and a combination thereof and the electrolyte comprises at least one carbonate, wherein the electrolyte further comprises an additive which comprises at least one organocatalyst.

(18) A battery wherein the anode comprises a material which is lithium titanium oxide (LTO) and the electrolyte comprises at least one carbonate, the electrolyte further comprising an additive which comprises at least one organocatalyst.

(19) Use according to any one of (1)-(5) above or method according to any one of (6)-(10) above or an electrolyte according to any one of (11)-(13) above or a battery according to any one of (14)-(18) above, wherein the organocatalyst is an alkaloid compound.

(20) Use according to any one of (1)-(5) above or method according to any one of claims (6)-(10) above or an electrolyte according to any one of (11)-(13) above or a battery according to any one of (14)-(18) above, wherein the organocatalyst is an amidine compound.

(21) Use according to any one of (1)-(6) above or method according to any one of (6)-(10) above or an electrolyte according to any one of (11)-(13) above or a battery according to any one of (14)-(18) above, wherein the organocatalyst is 1,8-diazabicyclo[5.4.0]undec-7-ene (DBU).

(22) Use according to (3) above or method according to (8) above or a battery according to (16) above, wherein the reactive groups are OH, SH or a combination thereof.

(23) Use according to any one of (1)-(5) above or method according to any one of claims (6)-(10) above or an electrolyte according to any one of (11)-(13) above or a battery according to any one of (14)-(18) above, wherein the carbonate is a linear, branched or cyclic carbonate which is saturated or unsaturated.

(24) Use according to any one of (1)-(5) above or method according to any one of (6)-(10) above or an electrolyte according to any one of (11)-(13) above or a battery according to any one of (14)-(18) above, wherein the carbonate has a general formula I below.

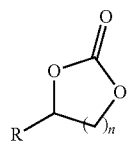

I wherein: R is a $C_1$-$C_{12}$ linear, branched or cyclic alkyl group; and n is an integer from 1 to 6.

(25) Use according to any one of (1)-(5) above or method according to any one of (6)-(10) above or an electrolyte according to any one of (11)-(13) above or a battery according to any one of (14)-(18) above, wherein the carbonate is propylene carbonate.

(26) Use according to any one of (1)-(5) above or method according to any one of (6)-(10) above or an electrolyte according to any one of (11)-(13) above or a battery according to any one of (14)-(18) above, wherein the electrolyte further comprises a salt selected from the group consisting of $LiPF_6$, LiFSI, LiTFSI, LiBOB, $LiBF_4$ and a combination thereof.

(27) Use according to any one of (1)-(5) above or method according to any one of (6)-(10) above or an electrolyte according to any one of (11)-(13) above or a battery according to any one of (14)-(18) above, wherein the cathode is based on $LiMPO_4$ where M is Fe, Co, Ni or Mn, or the cathode is a high energy cathode.

(28) Use according to any one of (1)-(5) above or method according to any one of (6)-(10) above or an electrolyte according to any one of (11)-(13) above or a battery according to any one of (14)-(18) above, wherein the amount of organocatalyst in the electrolyte is about 0.5% or less.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings.

DESCRIPTION OF ILLUSTRATIVE EXAMPLES AND EMBODIMENTS

Figure 1:
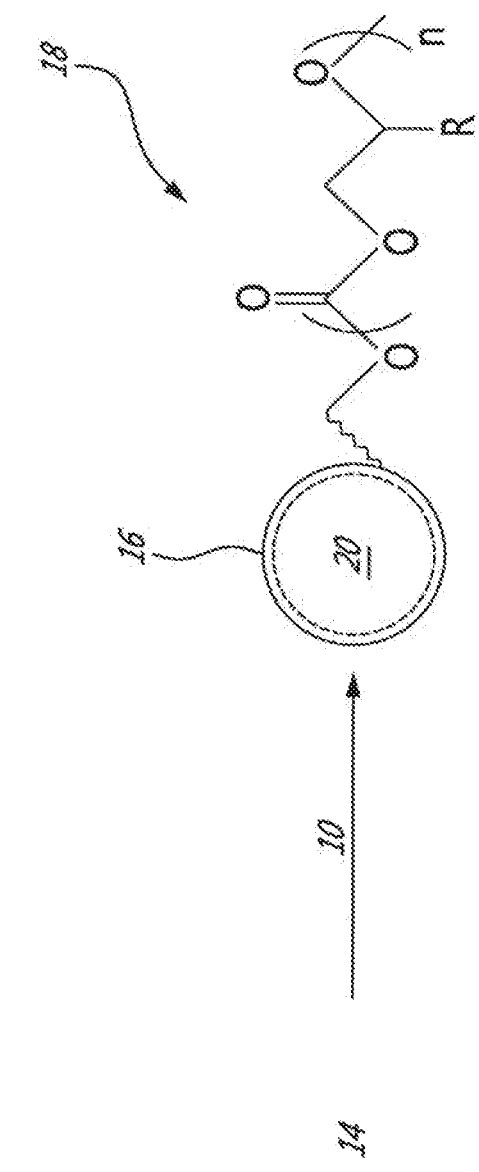
FIG. 1: Generally the chemical reaction on the surface of the anode, between the reactive groups of the anode and the carbonate of the electrolyte, catalyzed by an organocatalyst.
Figure 1:
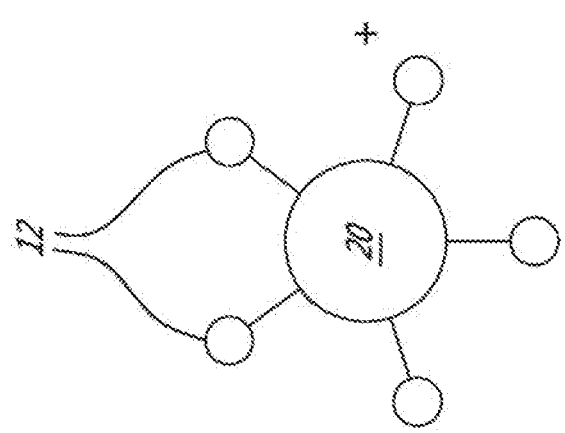

Before the present invention is further described, it is to be understood that the invention is not limited to the particular embodiments described below, as variations of these embodiments may be made and still fall within the scope of the appended claims. It is also to be understood that the terminology employed is for the purpose of describing particular embodiments, and is not intended to be limiting. Instead, the scope of the present invention will be established by the appended claims.

In order to provide a clear and consistent understanding of the terms used in the present specification, a number of definitions are provided below. Moreover, unless defined otherwise, all technical and scientific terms as used herein have the same meaning as commonly understood to one of ordinary skill in the art to which this invention pertains.

As used herein, the term "organocatalyst" is intended to refer to organic catalysts, which comprise carbon, hydrogen sulfur and other non-metal elements found in organic compounds.

As used herein, the term "reactive groups" is intended to refer to refer to chemical groups that may react with carbonates to form stable compounds such as polymers.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or containing (and any form of containing, such as "contain" and "contains"), are inclusive or open-ended and do not exclude additional, unrecited elements or process steps.

As used herein the term "about" is used to indicate that a value includes an inherent bon of error for the device or the method being employed to determine the value.

The present invention relates to the use of organocatalysts as additives in electrolytes for batteries. Such organocatalysts are disclosed for example by Nederberg et at [8], the content of which is herein incorporated by reference. Indeed, it is known in the art that reaction of a cyclic carbonate in the presence of 1,8-diazabicyclo[5,4,0]undec-7-ene, (DBU) is an attractive way to prepare a poly(carbonate).

In embodiments of the invention, the electrolyte comprises carbonates. The electrolyte may further comprise a salt, preferably a lithium salt.

In embodiments of the invention, the organocatalyst is an alkaloid. In other embodiments the organocatalyst is an amidine compound such as DBU.

The electrolyte according to the invention may be used in batteries wherein the anode comprises reactive groups. In embodiments of the invention the reactive groups are OH groups or SH groups, preferably OH groups.

Referring to FIG. 1, the organocatalyst (10) facilitates the reaction between the reactive groups (12) at the surface of the anode (20) and the carbonates (14) in the electrolyte. This leads to the formation of a protective layer (16) at the surface of the anode (20). The protective layer (16) prevents contact between the anode (20) and residual water in the battery. In particular according to embodiments of the invention, the protective layer (16) is made of polymer material (18) formed as illustrated. Batteries using the electrolyte according to the invention are more stable and secure.

Figure 2:
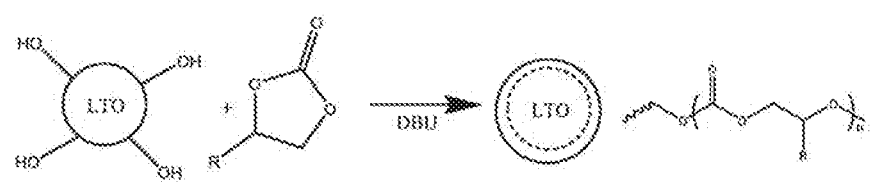
FIG. 2: Chemical reaction on the lithium titanium oxide (LTO) anode surface, between the hydroxyl groups and the carbonate, catalyzed by 1,8-diazabicyclo[5.4.0]undec-7-ene (DBU).
Figure 5:
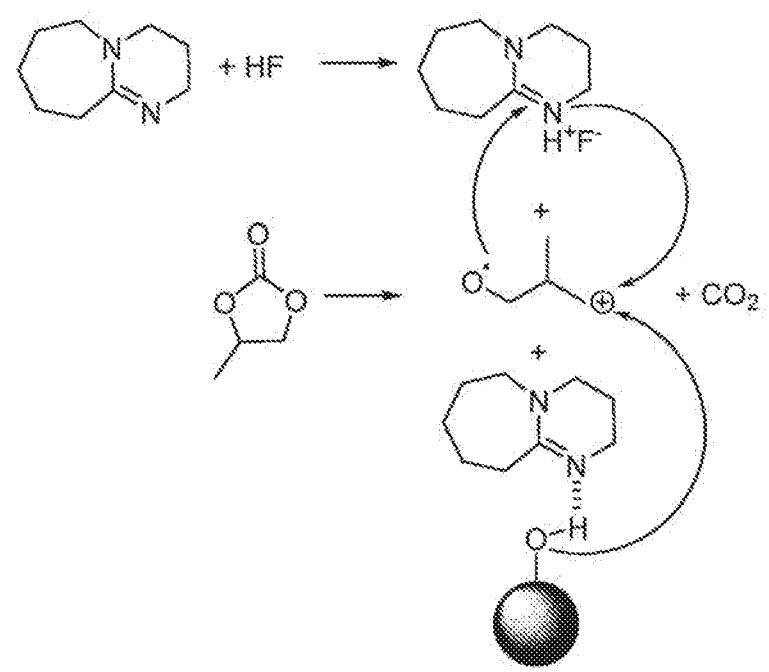
FIG. 5: Putative mechanism outlining the formation of the protective layer on the LTO anode surface.

In an embodiment of the invention, an organocatalyst, for example 1,8-diazabicyclo[5,4,0]undec-7-ene (DBU) is used, for the ring opening polymerization (ROP) of a cyclic carbonate (R may be a $C_1$-$C_{12}$ linear, branched or cyclic alkyl group which is saturated or unsaturated) at the surface of a lithium titanium oxide (LTO) anode. This is illustrated in FIG. 2. Indeed, the hydroxyl groups at the surface of LTO anode act as initiators and prioritize formation of the polymer on the LTO anode surface rather than on any other surfaces in the battery. The LTO anode is now coated (protected), which substantially limits the gas evolution in the battery. The undesirable reaction at the surface of the LTO anode between the electrolyte and residual water which involves the formation of gases is thus prevented. Also, as is illustrated in FIG. 5, the organocatalyst DBU may trap any HF, $CO_2$ and/or water formed during cycling of the battery. Moreover, degradation of the carbonates in the electrolyte may be prevented.

As will be understood by a skilled person, other carbonates may also be used. The carbonates may be linear, branched, saturated or unsaturated. In embodiments of the invention, the carbonate may be a compound of general formula I.

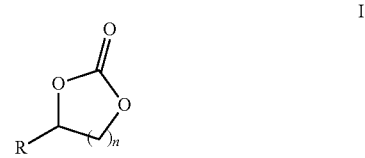

wherein: R is a $C_1$-$C_{12}$ linear branched or cyclic alkyl group; and n is an integer from 1 to 6.

As will be understood by a skilled person, other organocatalysts may also be used. Such organocatalysts may be any suitable organic catalysts known in the art, which comprise carbon, hydrogen sulfur and other non-metal elements found in organic compounds.

Figure 3:
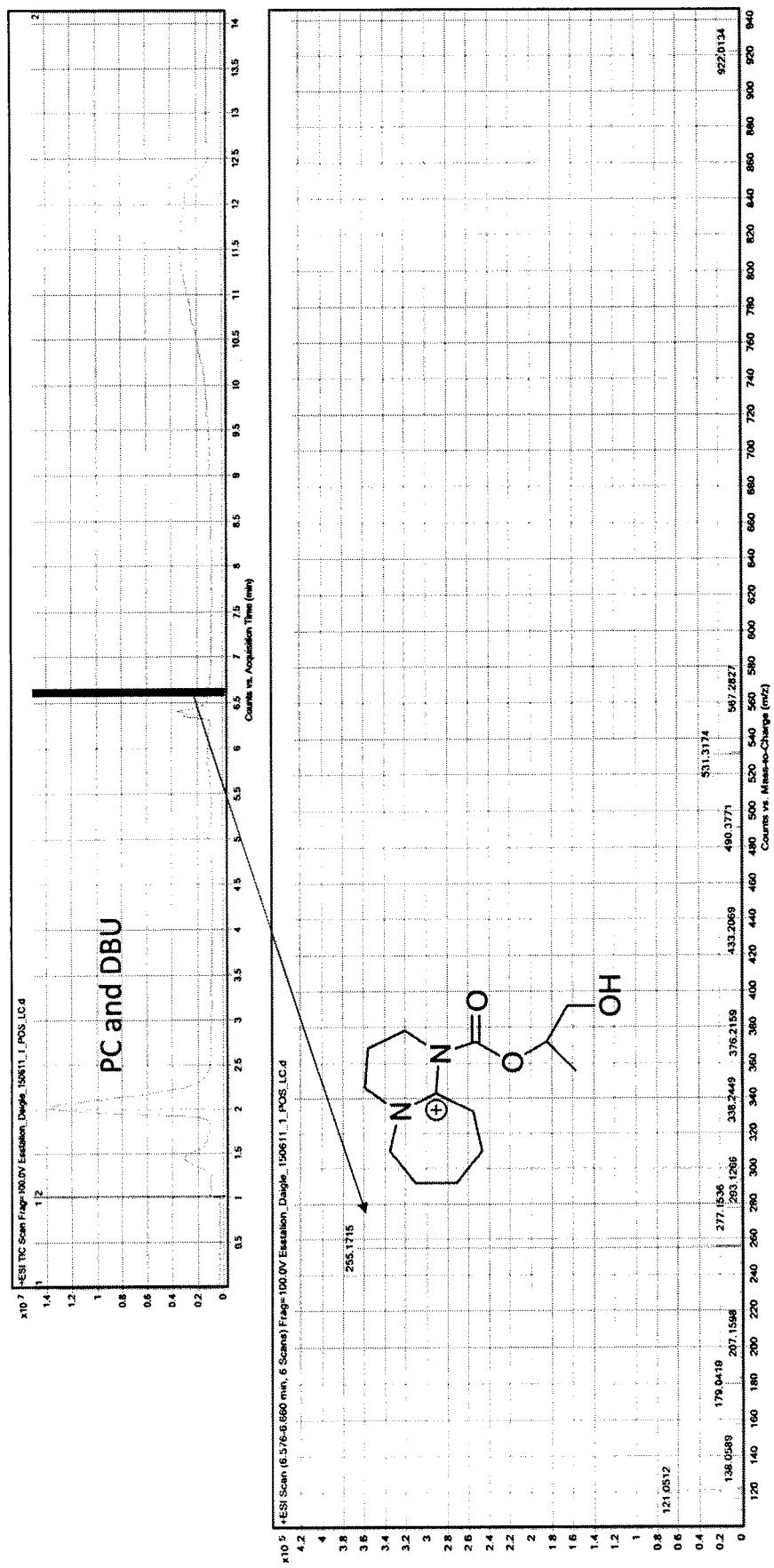
FIG. 3: HPLC-MS TOF of a model system.

The inventors have conducted the evaluation of the behavior of the DBU in model systems by $^1$H NMR and HPLC-MS. The model consists of a mixture of PC-DBU heated at 45° C. for 12 hours in order to simplify the analysis. FIG. 3 shows the spectrum obtained. The chains are started by a DBU with one insertion of PC by ROP. Also, the $^1$H NMR spectrum shows signals characteristics of poly(propylene carbonate) in small amount due to the presence of a large excess of PC and DBU.

Figure 4:
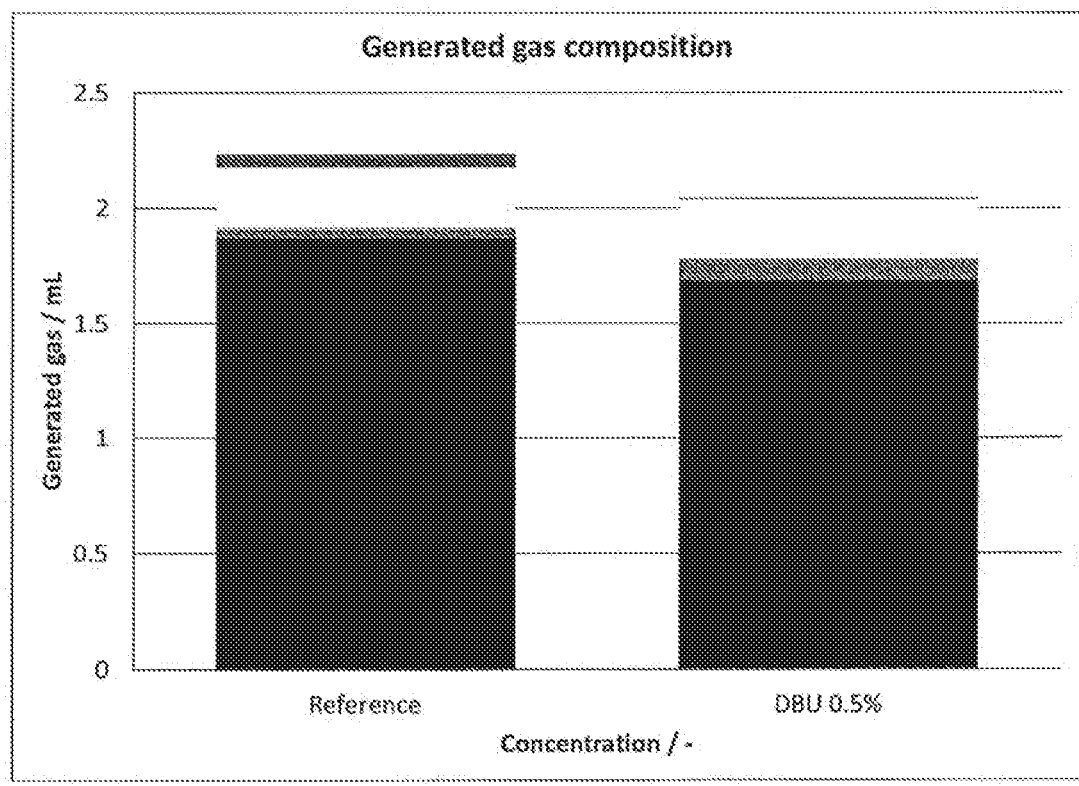
FIG. 4. Volume of gases inside the cells quantified by GC. Blue is hydrogen, red is propylene, light blue is methane, green is carbon dioxide and yellow is oxygen.

Addition of 0.5% of DBU or less in the electrolyte allows for a decrease of 20% vol of total gases. Specifically, the level of hydrogen, oxygen and propylene are decreased, however the level of carbon dioxide is increased as determined by gas chromatography (GC). FIG. 4 shows the level and the distribution of the gases inside the cells.

Based on the results obtained, a hypothesis for a putative mechanism of formation of the protective layer on the anode can be made. This is outlined in FIG. 5. As will be understood by a skilled person, a different mechanism may be attributed to the formation of the protective layer.

Figure 6:
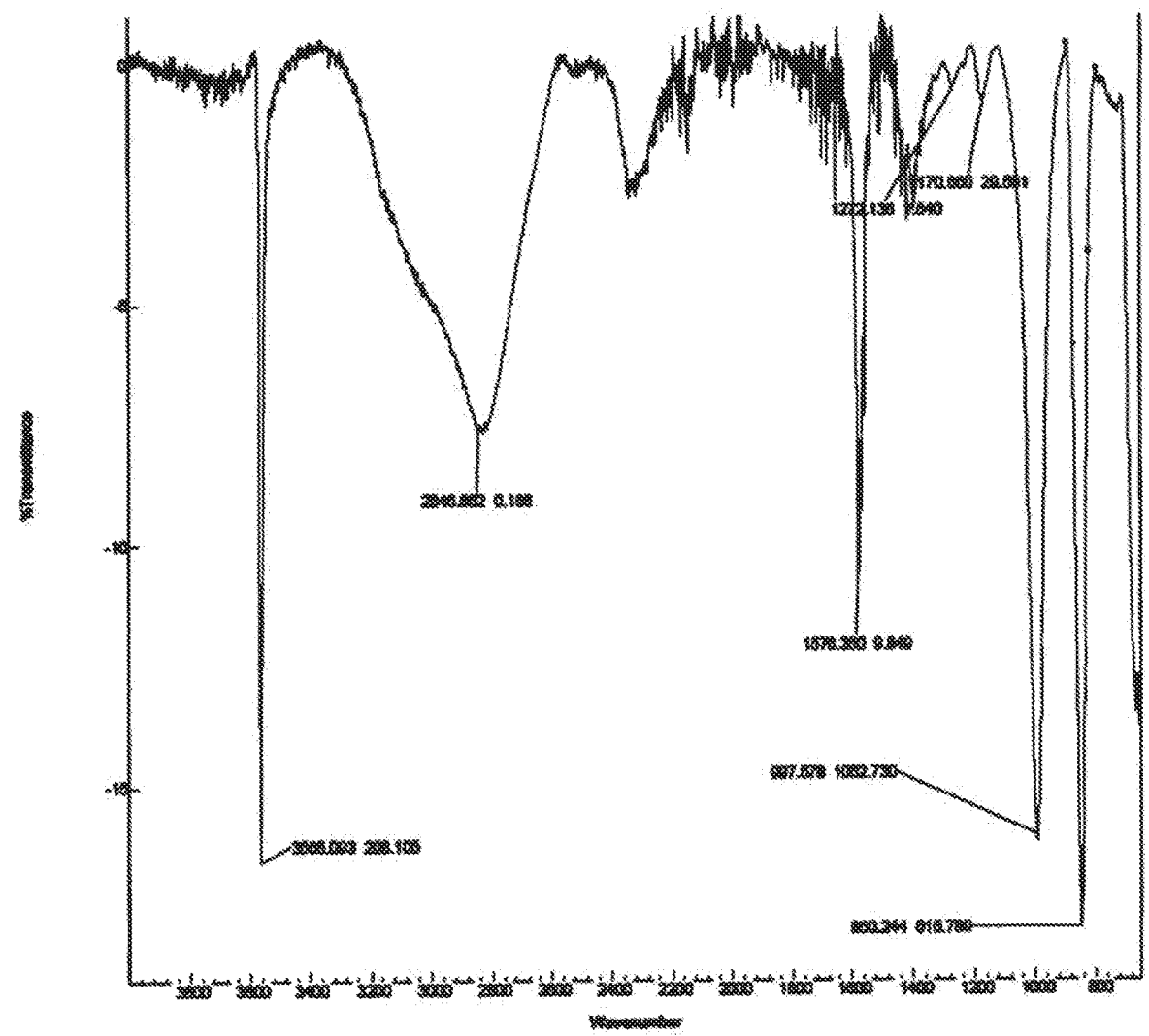
FIG. 6: FTIR spectrum of the anode with additive.

At a first step, propylene carbonate is degraded to produce $CO_2$ and the cationic and radical form of polypropylene oxide) (PPO). At the same time, DBU may neutralize HF. At a second step, polymerization of fragment of propylene oxide initiated by the hydroxyl groups located on the surface of the LTO anode and stabilized by DBU occurs. This cation is prompted to react with LTO or with PPO to form a stable layer at the surface of the LTO anode, the radical probably reacting with DBU [8-10]. The formation of PPO is also confirmed by FTIR equipped with ATR-diamond analysis of the anode; the spectrum does not show any band from the vibration of carbonyl group (1735 cm$^{-1}$), thus we may discard the presence polypropylene carbonate) (FIG. 6).

Formation of solid electrolyte interphase (SEI) occurs during the first stage of cycle. Extensive degradation of the electrode is thus avoided. The mechanism of formation is unclear, but it is believed that the reaction probably proceeds by a reduction of the electrolyte to form radicals which may initiate the formation of SEI [11,12]. Based on this mechanism, it is believed that use of DBU is also compatible with an anode of graphite because the DBU may react with radicals to form a stable SEI. As will be understood by a skilled person, use of DBU may also be compatible with other anodes, for example anodes comprising a material which is hydrogen titanium oxide (HTO), $TiO_2$, Si, $SiO_x$ and Sn.

Figure 7:
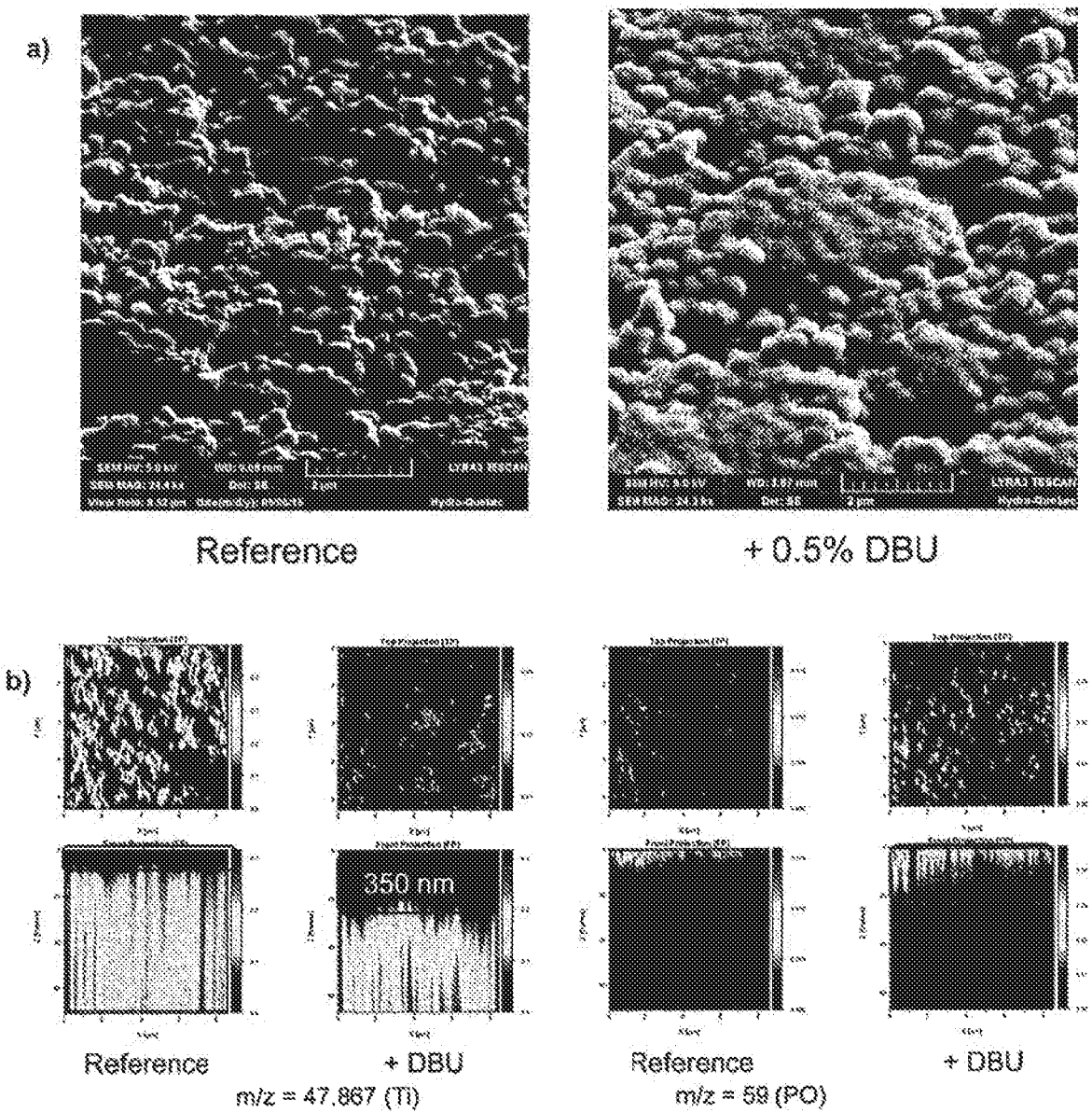
FIG. 7: a) Scanning electron microscopy (SEM) images, and b) Deep profile of m/z=59, this fragment corresponds to the propylene oxide and the fragment m/z=47.869 represents titanium.

Also, analysis of the surface by scanning electron microscopy (SEM) coupled with mass spectroscopy (MS) and a detector time of flight (TOF) confirmed the deposition of a layer of polymer at the surface of the anode. This layer has a thickness around 350 nm. This protective layer is confirmed by the presence of organic fragments related with polymer on at the surface of the anode. Also, the presence of titanium from LTO comparing with the reference suggests the presence of a coating on the LTO anode surface. FIG. 7a shows the SEM images, and FIG. 1b shows the deep profile of m/z=59, this fragment corresponds to the propylene oxide and the fragment m/z=47.869 represents titanium.

Figure 8:
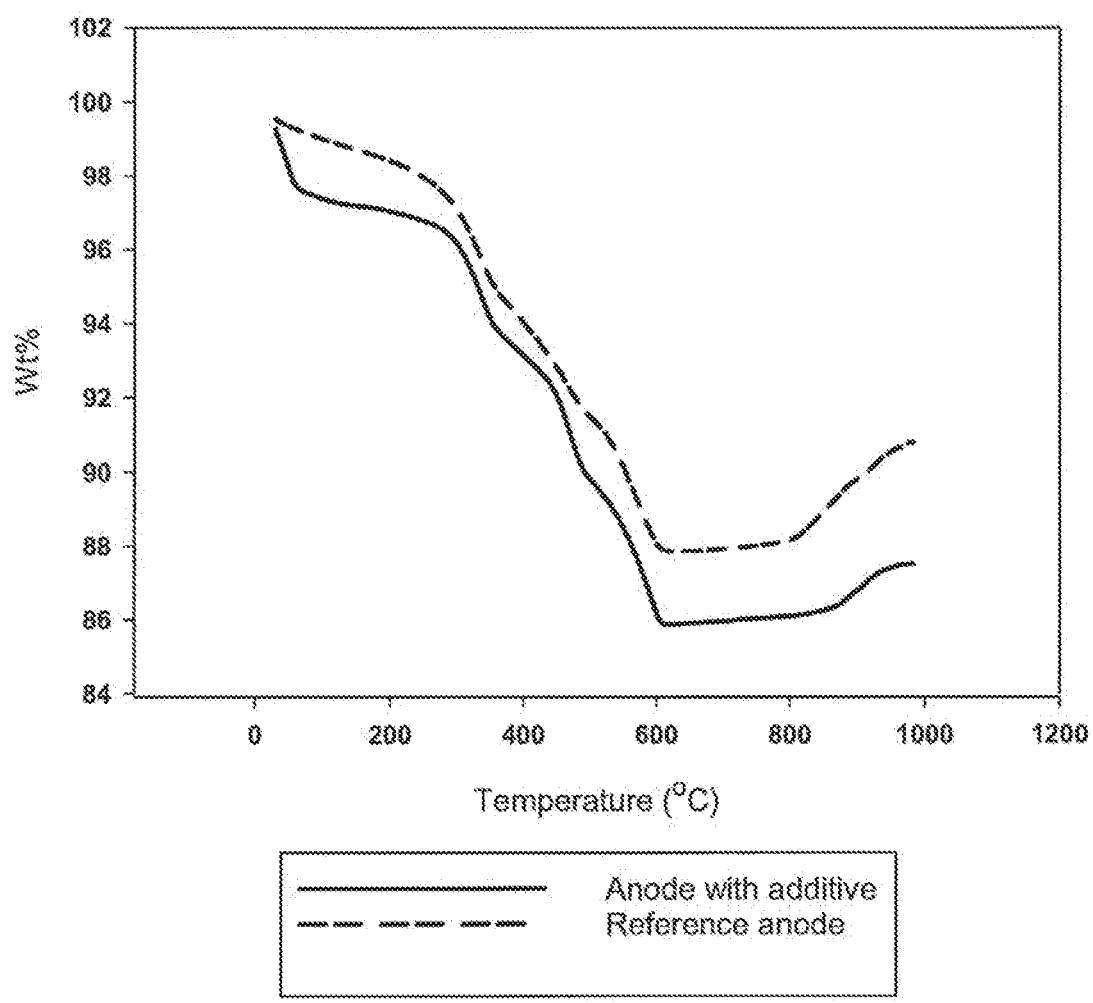
FIG. 8: Thermogravimetric analysis of the anodes.

That demonstrated the promotion of the formation of linear palmer by using lithium salt as catalyst [13]. Also, there is substantially no residue of DBU in the leachate after washing the negative electrode with deuterated chloroform for analysis by NMR. So, we may attribute this absence of DBU by the formation of the insoluble polymeric film. Moreover, there was a large proportion of fluoride in the polymer; however this fluoride does not appear to be in the LiF form, which is a conventional formation et the surface on LTO anode. We speculate that, the fluoride is in the acid form and has reacted with the DBU, thus avoiding the formation of gaseous HF inside the cell (not showed in FIG. 7) [10]. Also, this is supported by the thermogravimetric analysis of the anodes (FIG. 8).

Addition of DBU promotes the formation of a coating on the LTO anode surface and not on the poly(ethylene) separator. This may be desirable since obstruction of the pores of the separator with this polymer is prevented. This was confirmed by a visual inspection of the separator (cell with DBU) and by the cyclability of this cell after a float test at 45° C., and 2.4 V during 5 days. Usually, a cell without DBU (our reference) is not able to cycle after this process because the pores of the separator are completely filled up with the polymer resulting from the degradation of the cyclic carbonate.

We may divide the spectra in different sections of temperature which may be related with the degradation of different components. There is a first section on the plane line, this section is between 30-60° C. and we think it is related to the evaporation of HF. This section is only visible for the curve for the anode plus the additive. It is probably related to the trapping, of hydrogen fluoride. A second section is defined between 260-600° C., this section corresponds to the degradation of the polymer. The anode with the additive has 0.8 wt % more polymer according to weight lost. Finally, as already known, oxidation of LTO occurs at a temperature above 800° C. This process involves the reaction of the hydroxyl groups located on the surface of LTO anode, which is responsible of the degradation of the electrolyte. We have previously discussed the initiation of the polymerization by these groups, so the mechanism is confirmed by reduction of the oxidation for the anode with the additive. We observe a decreasing of 1.2 wt %. Thus the addition of DBU promotes the formation of a coating on the surface of the LTO anode initiated by the hydroxyl groups and stabilised by DBU (see FIG. 4).

Therefore, no polymers were observed on the poly(ethylene) separator, which constitutes an advantage because we have prevented the obstruction of the pores of the separator with the polymer. This was confirmed by a visual inspection of the separator (cell with DBU) and by the cyclability of this cell after a float test at 45° C. and 2.4 V for 5 days. Usually, a cell without DBU (our reference) is not able to cycle after this process because the separator is completely fills by polymer resulting from the degradation of cyclic carbonate.

Gas Suppression Effect

Figure 9:
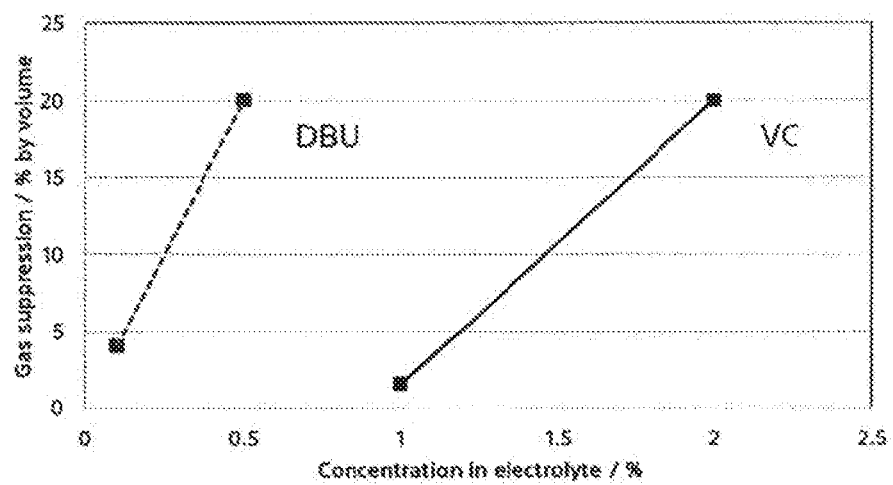
FIG. 9: Effect of gas suppression due to additives.

Vinylene carbonate (VC) is widely used in graphite based lithium ion batteries to suppress the degradation and obtain a long life. For example, when 2% of VC was put in the electrolyte, 20% of generated gas was suppressed (FIG. 9). Besides, 0.5% of DBU showed the same level of gas suppression. Small amount of DBU may be significantly effective.

Suppression of Short Circuit During the Float Test

Figure 10:
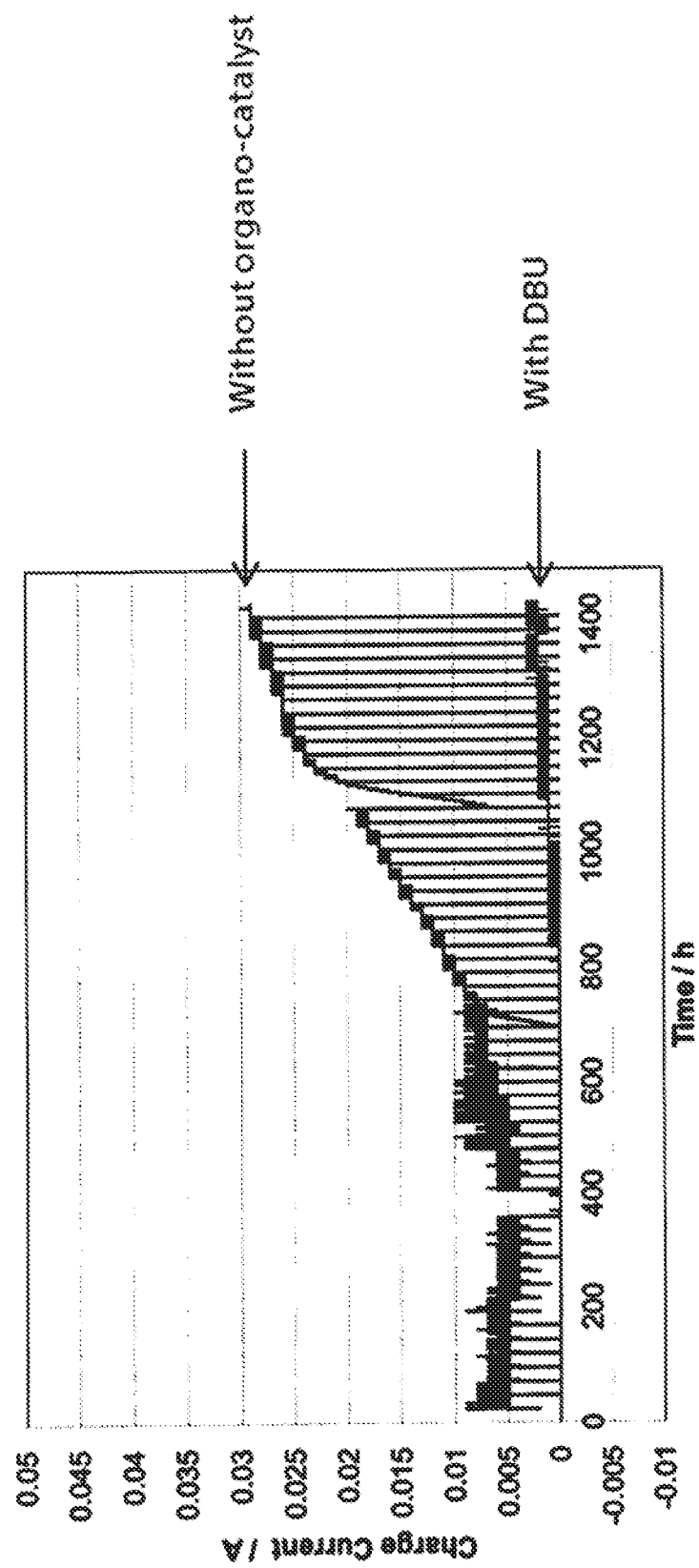
FIG. 10: Float current during the float test at 45° C.

FIG. 10 shows the float current during a float test. The current showed sudden rise for the reference cell without organocatalysts or additives indicating the micro short circuit in the cell. In contrast, the cell with DBU showed continuous low float current meaning higher stability at high temperature condition at 45° C.

Effect on the Internal Resistance in the Cell

Figure 11:
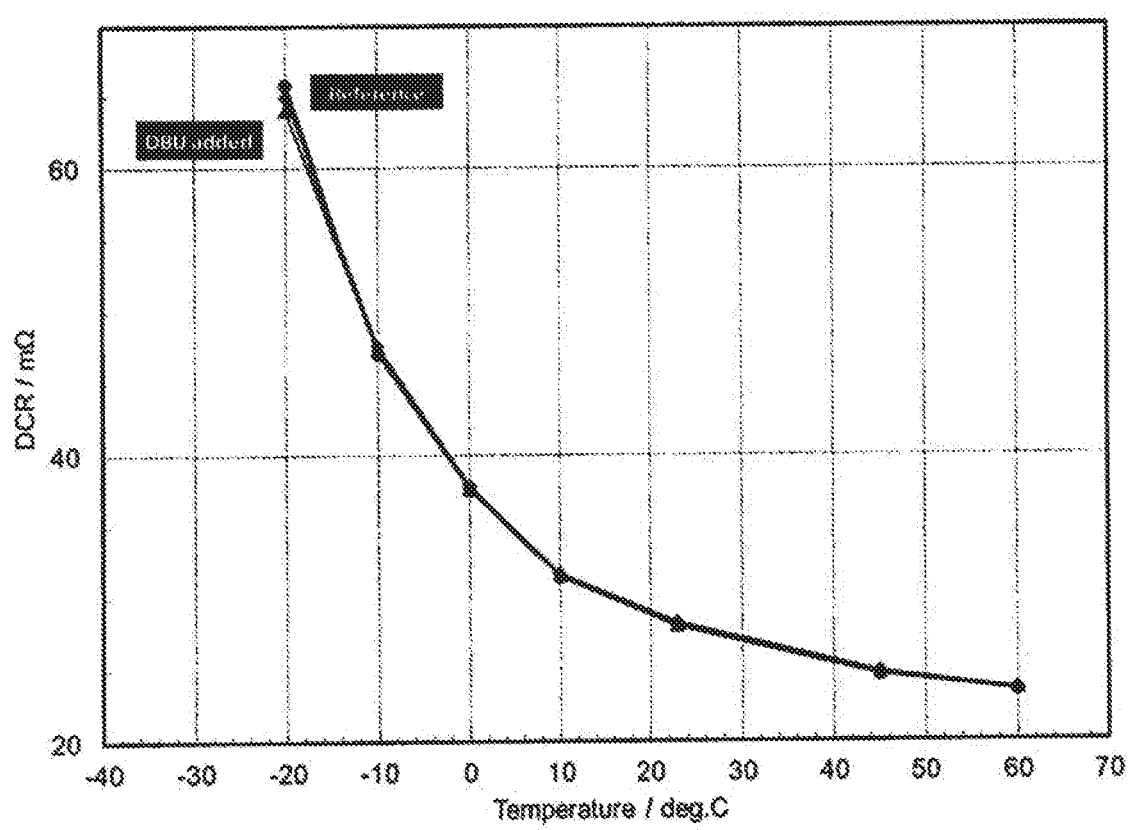
FIG. 11: Discharge/direct current resistance (DCR) at various temperatures.

FIG. 11 shows the direct current resistance (DCR) of the cells at various temperatures. The values were obtained at 10 seconds of discharge for 1 ltA and 3 ltA.

Usually an additives or a protective coating increases the initial resistance in the cell instead of suppressing the degradation. The result shows that there is no significant resistance increase for a DBU added cell. In other words, DBU does not impede the power performance of the cell on a wide temperature operation range.

Cycle Performance at Various Temperatures

Figure 12:
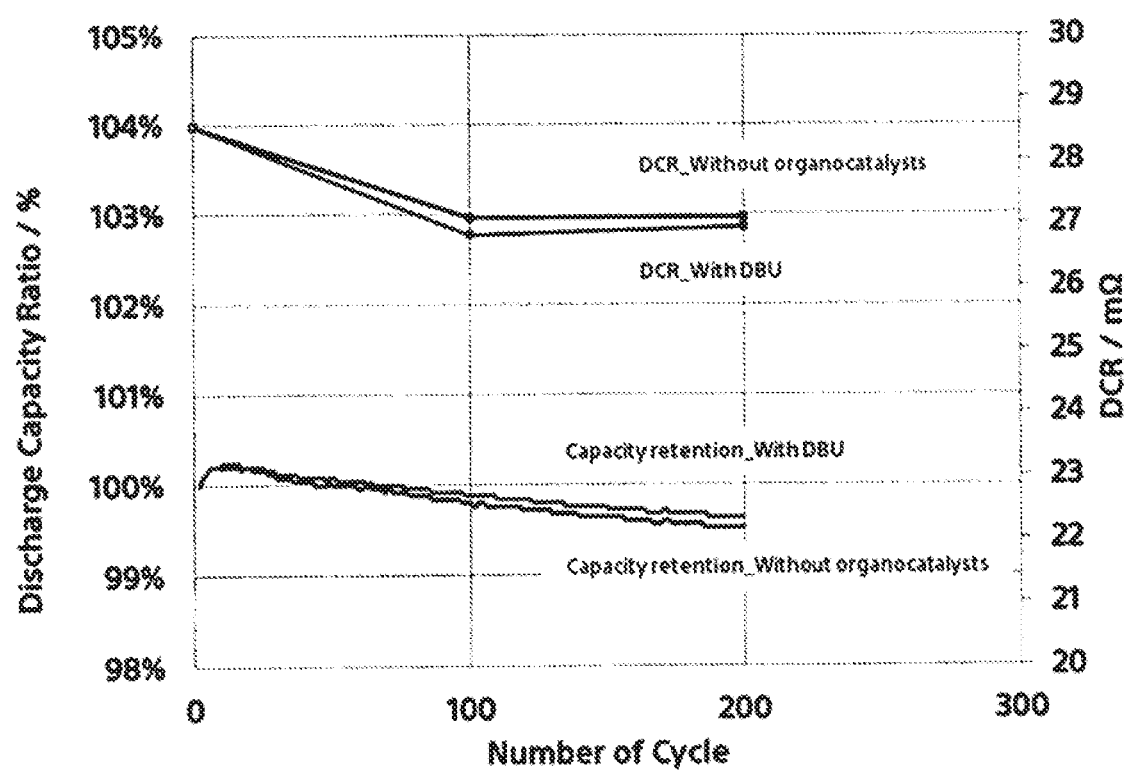
FIG. 12: Capacity retention and the variation of DCR during the cycle test at 45° C.

High temperature at 45° C.: FIG. 12 shows cycle performance at 45° C. The cell with DBU showed better capacity retention indicating less degradation compared to the reference cell without organocatalysts, even at a high temperature environment. It may significantly improve the long-term stability of battery and its system. DCR remained at the same level or less than that of the reference, which indicates that DBU does not impede the battery performance.

Figure 13:
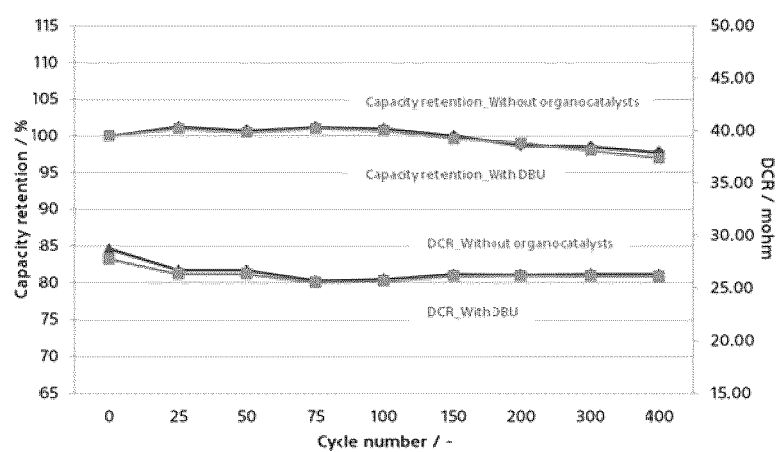
FIG. 13: Capacity retention and the variation of DCR during the cycle test at −10° C.

Low temperature at −10° C.: FIG. 13 shows cycle performance at −10° C. The values of DCR were obtained at 23° C. using the same method as described above. Both the capacity retention and the variation of DCR for DBU added cell showed the same level as the reference. In this temperature range we do not expect much side reaction such as gas evolution, so it is reasonable that we do not see significant differences. As can be seen, DBU does not impede the power performance.

Regarding these properties outlined above, DBU may suppress the gas even when added at a small amount, and keeps sufficient battery performance on a wide temperature operation range.

Although the present invention has been described hereinabove by way of specific embodiments thereof, it can be modified, without departing from the spirit and nature of the subject invention as defined in the appended claims.

The present description refers to a number of documents, the content of which is herein incorporated by reference in their entirety.

REFERENCES

1. Belharouak, I.; Amine, K.; Koenig, G.; Tan, T.; Yumoto, H.; Ota, N. In *Gassing and performance degradation in*

Li₄Ti₅O₁₂ based Li-ion batteries, 29th International Battery Seminar and Exhibit 2012: Primary and Secondary Batteries—Other Technologies, 2012; pp 874-887.
2. Wu, K.; Yang, J.; Liu, Y.; Zhang, Y.; Wang, C.; Xu, J.; Ning, F.; Wang, D., Investigation on gas generation of Li₄Ti₅O₁₂/LiNi₁/₃Co₁/₃Mn₁/₃O₂ cells at elevated temperature. *Journal of Power Sources* 2013, 237 (0), 285-290.
3. Wu. K.; Yang, J.; Zhang, Y.; Wang. C.; Wang, D., Investigation on Li4Ti5O12 batteries developed for hybrid electric vehicle. *J. Appl. Electrochem.* 2012, 42 (12), 989-995.
4. (a) Han, L.; Wang, S. W.; Xiao, F., The analysis and research on the coating and drying method of electrode of the Li-ion power battery, in *Advanced Materials Research,* 2013: Vol. 765-767, pp 3184-3187.
5. Kim, S. Y.; Rhee, S., A study on improving drying performance of spinel type LiMn₂O₄ as a cathode material for lithium ion battery. *International Journal of Electrochemical Science* 2011, 6 (11), 5462-5469.
6. Bouayad, H.; Wang, Z.; Dupré, N.; Dedryvère, R.; Foix, D.; Franger, S.; Martin, J. F.; Boutafa, L.; Patoux, S.; Gonbeau, D.; Guyomard, D., Improvement of Electrode/Electrolyte Interfaces in High-Voltage Spinel Lithium-Ion Batteries by Using Glutaric Anhydride as Electrolyte Additive. *The Journal of Physical Chemistry C* 2014, 118 (9), 4634-4648.
7. Lu, Q.; Fang, J.; Yang, J.; Feng, X.; Wang, J.; Null, Y., A polyimide ion-conductive protection layer to suppress side reactions on Li₄Ti₅O₁₂ electrodes at elevated temperature *RSC Advances* 2014, 4 (20), 10280-10283.
8. Nederberg, F.; Lohmeijer, B. G. G.; Leibfarth, F.; Pratt, R. C.; Choi, J.; Dove, A. P.; Waymouth, R. M.; Hedrick. J. L., Organocatalytic Ring Opening Polymerization of Trimethylene Carbonate. *Biomacromolecules* 2007, 8 (1), 153-160.
9. Brown, H, A.; De Crisci, A. G.; Hedrick, J. L.; Waymouth, R. M., Amidine-Mediated Zwitterionic Polymerization of Lactide. *ACS Macro Letters* 2012, 1 (9), 1113-1115.
10. Choi, N.-S.; Han, J.-G.; Ha, S.-Y.; Park, I.; Back, C.-K., Recent advances in the electrolytes for interfacial stability of high-voltage cathodes in lithium-ion batteries. *RSC Advances* 2015, 5 (4), 2732-2748.
11. Zhang, S.; Ding, M. S.; Xu, K.; Allen, J.; Jow, T. R., Understanding Solid Electrolyte Interface Film Formation on Graphite Electrodes. *Electrochemical and Solid-State Letters* 2001, 4 (12), A206-A208.
12. Xu, K., Electrolytes and Interphasial Chemistry in Li Ion Devices. *Energies* 3 (1), 135.
13. Chang, Y. A.; Waymouth, R. M., Ion pairing effects in the zwitterionic ring opening polymerization of [small delta]-valerolactone. *Polymer Chemistry* 2015, 6 (29), 5212-5218.

The invention claimed is:

1. An electrolyte for a battery, comprising an additive which comprises
   at least one organocatalyst, and
   a solvent, the solvent consisting essentially of one or more carbonates having a general formula I below:

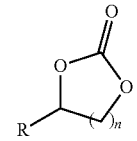

I wherein R is a $C_1$-$C_{12}$ linear, branched or cyclic alkyl group, and n is an integer from 1 to 6;
wherein the organocatalyst comprises 1,8-diazabicyclo [5.4.0]undec-7-ene (DBU); and
wherein DBU is present in an amount of about 0.5% or less.

2. An electrolyte according to claim 1, wherein the electrolyte further comprises a salt selected from the group consisting of LiPF₆, LiFSI, LiTFSI, LiBOB, LiBF₄ and a combination thereof.

3. An electrolyte according to claim 1, wherein the amount of organocatalyst in the electrolyte is about 0.5% or less.

4. An electrolyte according to claim 1, wherein the solvent is propylene carbonate.

5. An electrolyte according to claim 1, wherein the organocatalyst consists of DBU.

6. A battery comprising an electrolyte as defined in claim 1, an anode, and a cathode.

7. A battery according to claim 6, wherein the cathode of the battery is based on LiMPO₄ where M is Fe, Co, Ni or Mn, or the cathode is a high energy cathode.

* * * * *